Aug. 17, 1954
W. M. BLOOM ET AL
2,686,643
CONDUIT SPACER
Filed Jan. 18, 1949
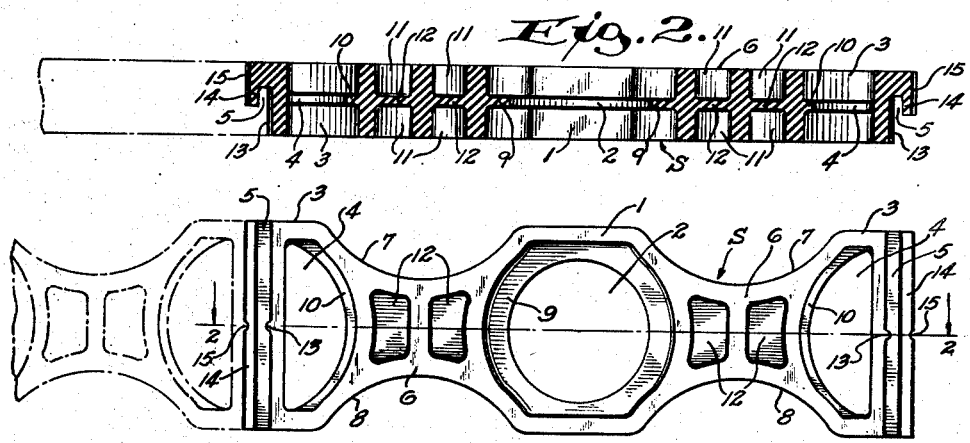
Fig. 2.
Fig. 1.
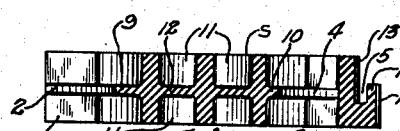
Fig. 4.
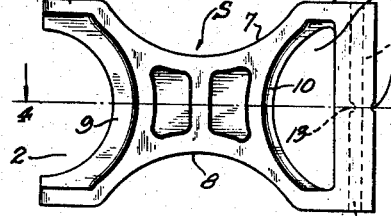
Fig. 3.
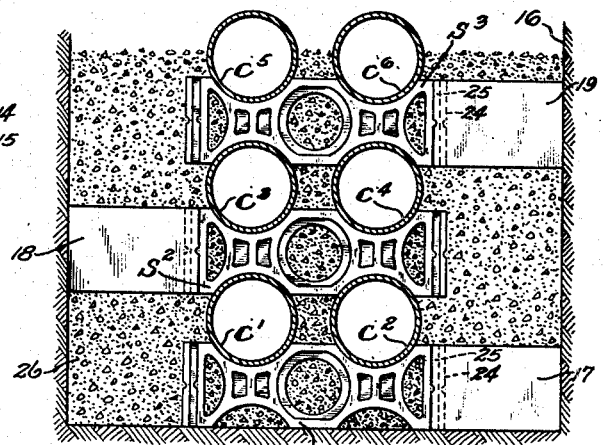
Fig. 5.
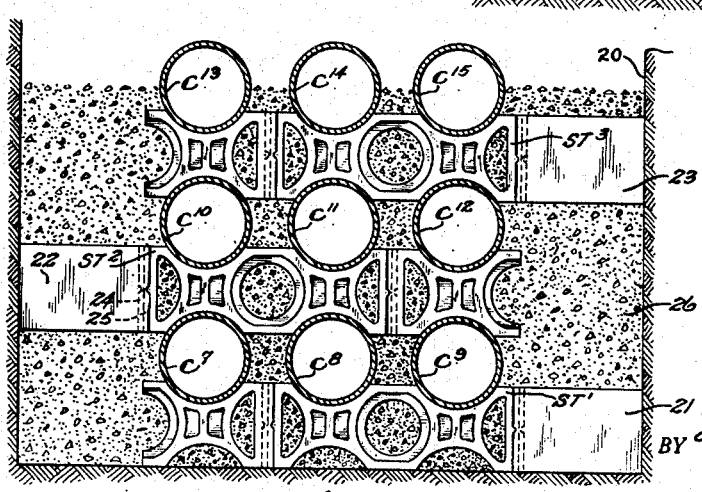
Fig. 6.
INVENTOR.
Wallace M. Bloom
BY Aldred J. Simmons
Chester W Brown
ATTORNEY.

Patented Aug. 17, 1954

2,686,643

UNITED STATES PATENT OFFICE 2,686,643

CONDUIT SPACER

Wallace M. Bloom, South Milwaukee, and Aldred J. Simmons, Plymouth, Wis., assignors to McGraw Electric Company, Milwaukee, Wis., a corporation of Delaware Application January 18, 1949, Serial No. 71,492

1 Claim. (Cl. 248—49)

This invention relates to improvements in conduit spacers.

The primary object of this invention is to provide a conduit spacer for supporting conduit lines in vertically and/or horizontally spaced relationship to each other, such spacer being arranged for permanent connection with other similar spacers to serve therewith as a unit for supporting a plurality of horizontally spaced conduit lines in spaced vertical relation to a similar number of horizontally spaced conduit lines.

Another object is to provide a spacer which will make it unnecessary for the user to stock a large number of different sizes of spacers and which will permit such user to stock only one size adapted for unit combinations functioning as spacers of different sizes.

A further object is to provide a spacer which is inherently strong, is light in weight, is highly resistant to fire, will not support its own combustion in air, may be molded with a minimum of molding equipment, and is economical to manufacture, ship, store, use, and install.

In the drawings:

Fig. 1 is a plan view of a spacer embodying this invention.

Fig. 2 is a sectional view taken on the line 2—2 of Fig. 1.

Fig. 3 is a view of a spacer portion as it appears when the spacer shown in Fig. 1 is cut in two parts, this portion being reversed to show the rear face relative to Fig. 1.

Fig. 4 is a sectional view taken on the line 4—4 of Fig. 3.

Fig. 5 is a sectional view illustrating an installation of a conduit system supported by spacers embodying this invention.

Fig. 6 is a view similar to Fig. 5 illustrating another arrangement in which spacers embodying this invention are used.

Like numerals indicate like parts in the various views.

The conduit spacer S is generally rectangular in shape and bilaterally symmetrical and is preferably made of non-combustible material such as a composition of asbestos fiber and asphalt which may be molded in a suitable form. Obviously, other materials can be used if desired.

As indicated in Fig. 1, the spacer is provided with a central portion 1 which is apertured at 2, end portions 3 which are each apertured at 4 and provided with a channel 5, and portions 6 between portions 1 and 3 each having opposed upper and lower arcuate or dished conduit supporting surfaces 7 and 8, respectively.

Fig. 2 illustrates the transverse construction of the spacer taken on the line 2—2 of Fig. 1. The aperture 2 is located within the annular rib 9 and apertures 4 are each bounded on one side by the semi-circular rib 10. Each of the portions 6 is recessed on each side at 11 to provide ribs 12.

The channel 5 in each end portion 3 is provided with a centrally located transverse rib 13 on one wall and the end wall 14 of the channel is transversely notched at 15.

Each spacer, as illustrated in Figs. 1 and 2, is designed for stacking two vertical rows of conduits in the manner hereafter noted with reference to Fig. 5. When it is desired to stack three vertical rows in the manner illustrated in reference to Fig. 6, some of the spacers are cut in two parts (see Figs. 3 and 4) and each part is connected to a complete one.

It was heretofore noted that each end of the illustrated spacer is provided with a channel 5 having a rib 13 therein on one wall and a groove 15 exteriorly thereof on the end wall 14. The width of the channel 5 is substantially the same width as the end wall 14 thereof. Thus two spacers may be connected end to end by inserting an end wall 14 of each into the adjacent channel 5 of the other. In Figs. 1 and 2, the dash-dot lines illustrate the manner in which two spacers are connected. The groove 15 on each of the end walls 14 of each spacer receives the rib 13 in the channel 5 of the other spacer and thereby locks the spacers in endwise alignment and against shifting longitudinally relative to the channels. Preferably, the end wall 14 fits snugly in frictional contact with the inner walls of the channel 5 receiving the end wall 14.

When conduits are stacked in two vertical rows in a trench 16 as indicated in Fig. 5, a spacer $S^1$ is placed on the bottom of the trench, bottom conduits $C^1$ and $C^2$ are placed upon the spacer $S^1$ so they are seated in the upper arcuate supporting surfaces 7, a spacer $S^2$ is placed on the bottom conduits $C^1$ and $C^2$ with the lower arcuate supporting surfaces 8 in contact therewith, intermediate conduits $C^3$ and $C^4$ are placed upon the spacer $S^2$ in contact with the upper arcuate supporting surfaces 7, a spacer $S^3$ is placed on the intermediate conduits $C^3$ and $C^4$, and upper conduits $C^5$ and $C^6$ are placed on the upper spacer $S^3$. Side blocks or end spacers 17, 18, and 19 are provided for the purpose of holding the stack of conduits in an upright position and each is attached to spacers $S^1$, $S^2$, and $S^3$, respectively, in the manner hereafter indicated.

When conduits are stacked in three vertical rows in a trench 20 as indicated in Fig. 6, the procedure is similar to that described with reference to Fig. 5, but before such procedure is followed, conduit spacers are cut to provide additional sections as previously noted with reference to Figs. 1 through 4 and are connected to a complete conduit as illustrated in Figs. 1 and 2. The conduit spacers when thus combined will be referred to in reference to Fig. 6 as $ST^1$, $ST^2$, and $ST^3$.

Conduit spacer $ST^1$ rests upon the bottom of trench 20; bottom conduits $C^7$, $C^8$ and $C^9$ rest on spacer $ST^1$; spacer $ST^2$ rests on the bottom conduit; intermediate conduits $C^{10}$, $C^{11}$, and $C^{12}$ rest on spacer $ST^2$; spacer $ST^3$ rests on the intermediate conduit; and upper conduits $C^{13}$, $C^{14}$, and $C^{15}$ rest on spacer $ST^3$. As in Fig. 5, side blocks 21, 22 and 23 are provided for the purpose of holding the stack of conduits in an upright position.

Each side block 17, 18, 19, 21, 22, and 23 is provided at one end with a channel 24 having a transverse rib on one wall and a transverse notch on the end wall 25. In this respect, the end construction of each block is the same as the end construction of the spacer S. Each of these side blocks is connected to an adjacent spacer by inserting the end wall 25 of the block into the channel 5 of the spacer and simultaneously inserting the end wall 14 of the spacer into the channel 24 of the block, it being understood that at the same time, the ribs of each channel are registered with the notches in the end of the block and spacer and thereby retaining the block and spacer in longitudinal alignment.

After the conduit has been stacked as indicated in Figs. 5 and 6, the trench in either case is filled with concrete 26. It will be apparent that the concrete in its flowable condition will virtually fill all spaces including the recesses 11 and apertures 2 and 4 in the spacers and upon setting will add rigidity and strength to that of the spacers and side blocks.

Preferably, the spacer is made as a unit for supporting two vertically stacked rows of conduits and thereby eliminating all requirements for stocking various multiple types heretofore necessary. Obviously, the spacer may be made as a unit for supporting a single vertical row of conduits or as a unit for supporting three or more vertical rows of conduits. However, the arrangement herein disclosed makes it possible to standardize in a unit which may be used for any number of vertical rows of conduits by merely cutting the unit in two parts for stacking a single row of conduits, or joining a complete unit with part of a unit for stacking three rows of conduits, or by joining two complete units for stacking four rows of conduits or appropriately arranging the unit for five or more rows of conduits.

From the foregoing it will be apparent that we have provided a novel conduit spacer, which is simple in construction, which may be assembled efficiently with conduits, which will serve for conduit assemblies of one or more vertically stacked rows of conduits, and which will be economical to manufacture, stack and assemble.

We claim:

Spacer means for underground conduits comprising sets of spacers, each spacer having at least two conduit supporting recesses at opposite sides thereof and adapted for seating on and supporting spaced conduits, each set comprising at least two spacers in horizontal alinement, the adjacent ends of said spacers each having interlocking means substantially identical to that of the other end interlocked therewith, said interlocking means comprising a channel extending transversely of the end of the spacer, one side wall of said channel defining said end of said spacer and substantially the same width as said channel and disposed in the channel of the other spacer in snug frictional contact with the side walls thereof, the wall in the channel and the end of the spacer having respectively a groove and a rib extending transversely of the spacer and its channel, the rib on each interlocking means being respectively disposed in the groove on the other interlocking means.

References Cited in the file of this patent

UNITED STATES PATENTS

| Number | Name | Date |
|---|---|---|
| 637,969 | Nordyke | Nov. 28, 1899 |
| 647,945 | Cope | Apr. 24, 1900 |
| 1,527,684 | Hull | Feb. 24, 1925 |
| 2,392,835 | Conlon | Jan. 15, 1946 |
| 2,462,399 | Hinchman | Feb. 22, 1949 |